Figure 1:
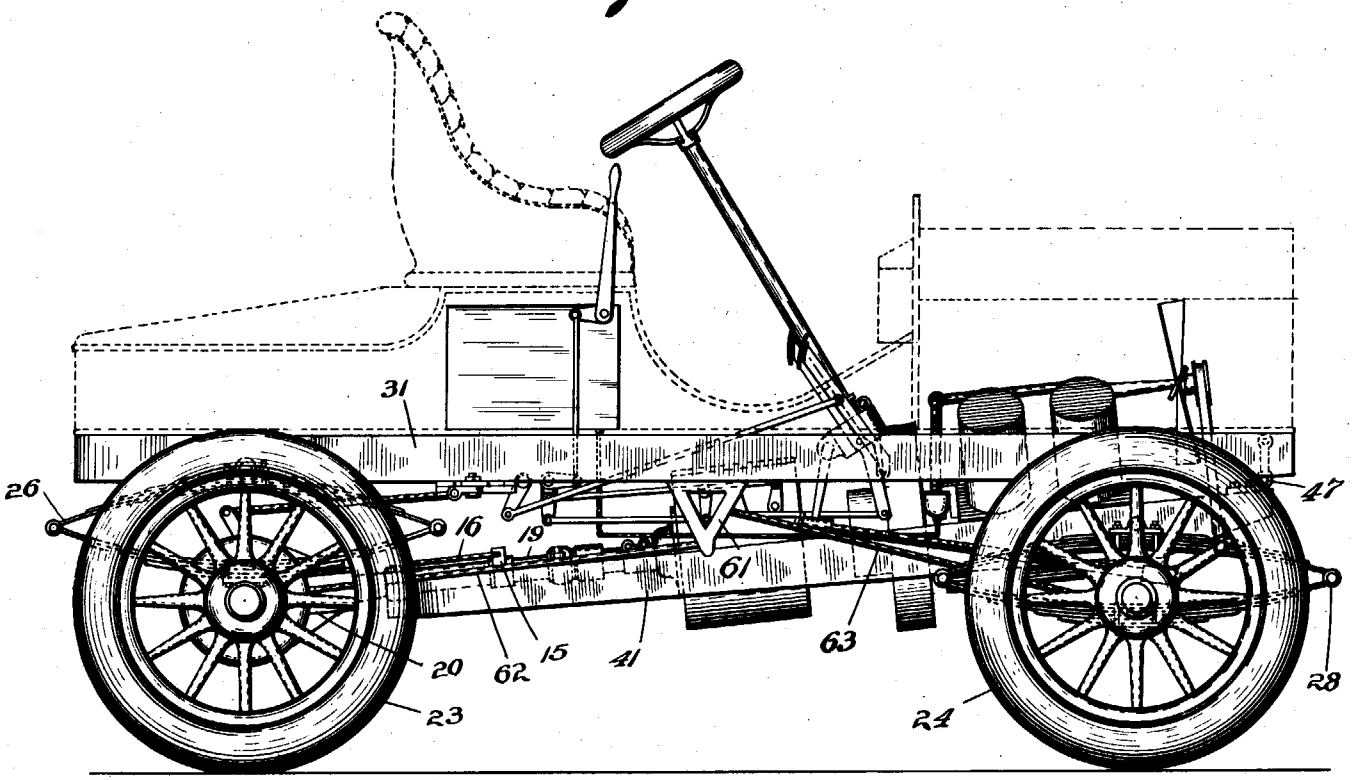

No. 12,609. REISSUED FEB. 12, 1907.

J. WARRINGTON & H. C. MARMON.

RUNNING GEAR FOR MOTOR VEHICLES.

APPLICATION FILED MAY 9, 1906.

3 SHEETS—SHEET 1.

Witnesses
Frank A. Fahle
Thomas H. McMeans

Inventors
Jesse Warrington, and
Howard C. Marmon
BY
Bradford & Hood
Attorneys

No. 12,609. REISSUED FEB. 12, 1907.
J. WARRINGTON & H. C. MARMON.
RUNNING GEAR FOR MOTOR VEHICLES.
APPLICATION FILED MAY 9, 1906.
3 SHEETS—SHEET 2.
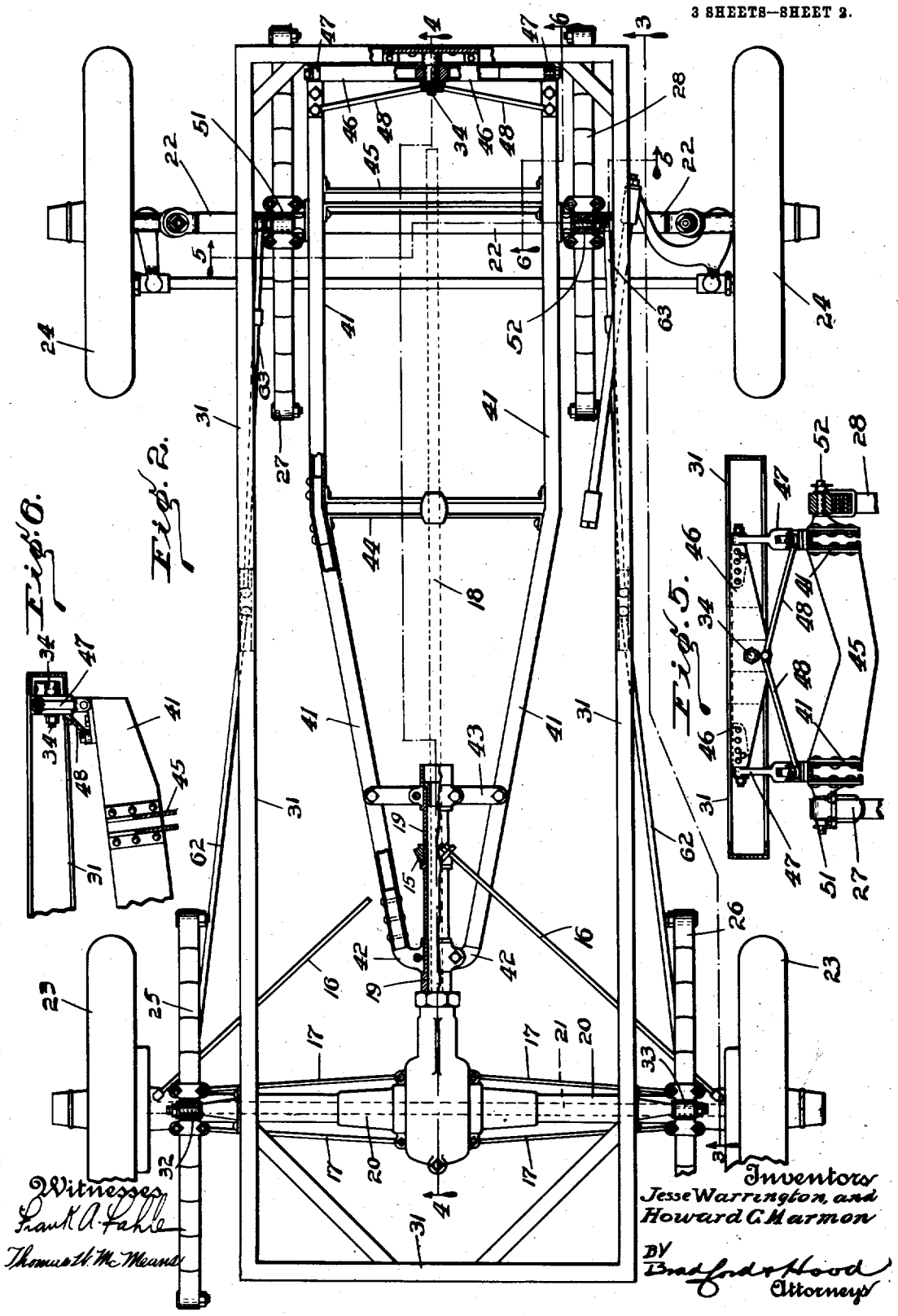

No. 12,609. REISSUED FEB. 12, 1907.
J. WARRINGTON & H. C. MARMON.
RUNNING GEAR FOR MOTOR VEHICLES.
APPLICATION FILED MAY 9, 1906.
3 SHEETS—SHEET 3.
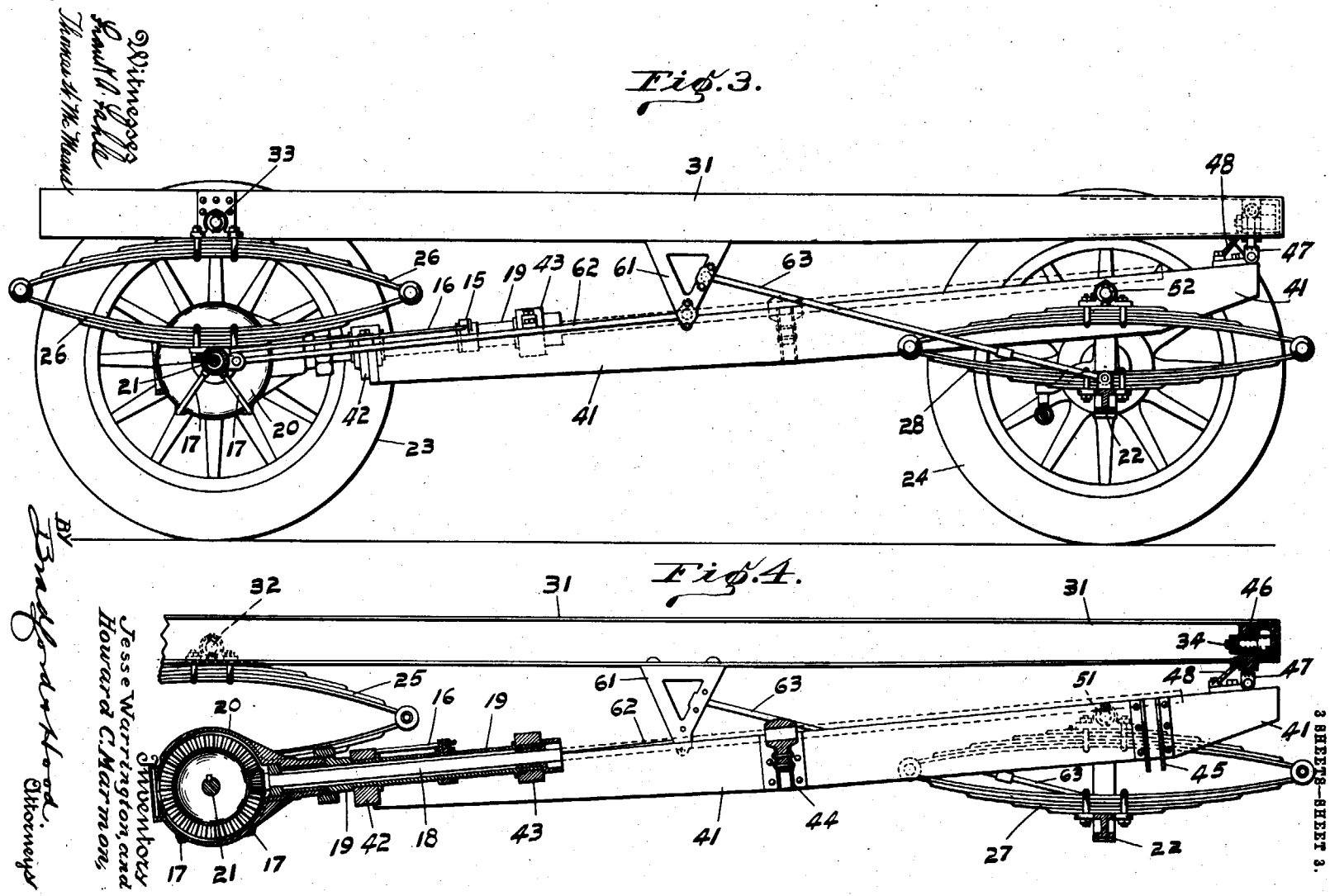

UNITED STATES PATENT OFFICE.

JESSE WARRINGTON AND HOWARD C. MARMON, OF INDIANAPOLIS, INDIANA, ASSIGNORS TO NORDYKE & MARMON COMPANY, OF INDIANAPOLIS, INDIANA, A CORPORATION OF INDIANA.

RUNNING-GEAR FOR MOTOR-VEHICLES.

No. 12,609. Specification of Reissued Letters Patent. Reissued Feb. 12, 1907.

Original No. 783,599, dated February 28, 1905. Application for reissue filed May 9, 1906. Serial No. 316,113.

*To all whom it may concern:*

Be it known that we, JESSE WARRINGTON and HOWARD C. MARMON, citizens of the United States, residing at Indianapolis, in the county of Marion and State of Indiana, have invented certain new and useful Improvements in Running-Gear for Motor-Vehicles, of which the following is a specification.

Motor-vehicles, as is well known, are heavy and embody a considerable amount of machinery. Such vehicles are frequently required to run over rough roads, so that the wheels encounter different (and constantly differing) surfaces as the vehicle progresses. It is of great importance, therefore, that the construction be such as to permit the necessary relative vertical movement of the wheels in respect to each other without throwing undue strain upon the machinery. It is also highly desirable that the movements in question shall not unduly tip the vehicle-body carrying the passengers.

The objects of our invention will be apparent from the statements just made; and the leading features of said invention consist in the provision of a motor-carrying frame which is spring-supported on one axle and a second frame, which is spring-supported on the other axle, the two frames being pivotally connected on an axis which is parallel with the line of travel—*i. e.*, at right angles to the axles. In order that there may be the greatest degree of flexibility between the wheels and the seat-frame, we connect the motor-frame and the rear axle (when this axle carries the wheel-driving shaft) by a pivotal connection, the axis of which is parallel with the line of travel—*i. e.*, at right angles to the axles. In any case the connection between the motor, carried by the motor-carrying frame, and the wheel-driving shaft must be such as to remain operative during relative movement of the two frames about their connecting pivotal axis.

Referring to the accompanying drawings, which are made a part hereof, and on which similar reference characters indicate similar parts, Figure 1 is a side elevation of a motor-vehicle embodying our said invention, the body, seat, and machinery-inclosing casing being indicated by means of dotted lines; Fig. 2, a top or plan view, on a somewhat enlarged scale, of the running-gear, omitting much of the mechanism of the automobile, but with the location of the driving-shaft and also of the rear axle indicated by dotted lines; Fig. 3, a side elevation of substantially the same parts shown in Fig. 2, but with the wheels and ends of the axle broken away as seen when looking in the direction indicated by the arrows from the dotted line 3 3 in Fig. 2; Fig. 4, a substantially central vertical sectional view as seen from the point indicated by the dotted line 4 4 in Fig. 2, the general position of that part of the main shaft not shown being indicated by means of dotted lines; Fig. 5, a transverse vertical sectional view as seen when looking in the direction indicated by the arrows from the dotted line 5 5 in Fig. 2, and Fig. 6 a detail view as seen when looking in the direction indicated by the arrows from the dotted lines 6 6 in Fig. 2.

In the construction selected for illustrating this invention the rear and front axles 20 and 22 are supported, respectively, by the usual ground-wheels 23 and 24. Upon the rear axle 20 are the springs 25 and 26, and upon the front axle 22 are the springs 27 and 28. The rear axle 20 preferably is a casing, which incloses the wheel-driving shaft 21 and the central portion of which is enlarged sufficiently to receive the compensator-gear, as shown in Fig. 4, and which also has a tubular extension 19, which ensheathes the main driving-shaft 18 for a considerable portion of its length. This whole structure is rendered very rigid by means of the brace-rods 17 and 16, the former of which are wholly connected to the main casing 20, while the latter extend farther forward and are connected to the tubular portion 19 by a suitable connecting means, as a collar 15.

A rectangular body-frame 31 is pivotally mounted at points 32 and 33 upon the springs 25 and 26 at one end, and at the other end said frame is supported by a single pivot substantially at right angles to the axles, as 34, which rests in a bearing carried by a motor-frame. Said motor-frame is shown as of a triangular form and extends back in a downwardly-inclined direction toward the axle 20. This frame is shown as composed of side bars 41 (which incline toward each other as they approach the axle 20, near which they are strongly connected by bars 42 to the tubular casing 19) and of suitable cross-bars 43, 44, 45, and 46, the latter of which is attached to the ends of the bars 41 by means of links 47 and preferably stay-rods 48.

The construction embodying the links 47 (just mentioned) permits the slight relative movement in use between the two principal frames incident to the yielding of the springs without throwing undue strain upon any of the parts. The motor-frame is pivotally supported at two points 51 and 52 (near that end which supports the frame 31 by means of the single pivot 34) upon the springs 27 and 28. At its other end this frame is supported centrally upon the sleeve or casing 19, this point of support being a pivotal one on an axis at right angles to the wheel-driving shaft, whereby a rocking movement of the whole frame about the main driving-shaft is permitted, and as said sleeve or casing is, in effect, a part of the axle 20, which surrounds and carries the wheel-driving shaft 21, said frame is, in effect, pivotally supported at this end from said axle.

The frame 31 carries the body and casing portions of the vehicle. The frame, which embodies the bars 41, carries the motor and gearing. The motor is located at a point near where the latter frame is supported by the springs 27 and 28, and consequently while the motor is spring-supported its support is largely independent of the springs by which the body or riding portion of the vehicle and frame 31 is mainly supported. The motor is therefore largely relieved from the sudden shocks occasioned by contact of the vehicle-wheels with obstruction in the roadway over which the vehicle is passing, but the body in which the passengers are seated is not thereby subjected to any great extent to the vibrations occasioned by the heavy weight of the motor and its connected mechanism being thrown upon the riding-springs; but the most important result of this mechanism is the freeing of the mechanism from strains occasioned by the passing of the wheels over unequal surfaces. As the frame 31 is pivoted at each of its supporting-points 32, 33, and 34, it is obvious that while the raising of one of the wheels 23 in respect to the other will tip the frame 31 bodily it will place upon it no wrenching strain, as it is supported at the other end only by the single longitudinal pivot 34. It is equally obvious that the raising of one of the wheels 24 in respect to the other will have little or no effect of any kind upon the frame 31. The raising of one of the wheels 24 in respect to the other will of course tip the frame 41 46, and with it the motor and mechanism carried thereby; but as said frame is pivotally mounted at the other end and as the axis of the main driving-shaft is coincident with the axis of the pivotal support it is obvious that no wrenching of the mechanism can be occasioned by this movement.

The pivot 34 is in the same vertical plane as the main driving-shaft of the machine. Its axial line, however, is somewhat above that of said driving-shaft and passes approximately through the center of gravity of the motor. The vibrations of the motor caused by the impulse-strokes are around a defined point that is approximately the center of gravity of the motor. By thus having the axis of the relative rotation of the two frames pass through this point the vibrations of the motor due to its explosion-strokes are not communicated to the body-carrying frame. The positioning of said pivot somewhat above said shaft is therefore in the interest of equable steady motion of the moving parts.

In the construction so far described and which we have adopted in carrying out our invention the frames 31 and 41, being mounted principally upon the vehicle-springs and there being no direct connection between the frames and the axles on account of the heavy strains which obstructions sometimes occasion, we have found it best to provide pivoted braces running from an intermediate point on the frame to near the ends of the axles to assist said axles in resisting such strains. In carrying out this we provide the downwardly-extending struts 61, which are attached about midway to the sides of the frame 31. From these struts we extend the brace-rods 62 rearwardly to the axle 20, to which they are secured, as indicated, and we also extend from the same struts the rods 63 forward to the axle 22, to which they are secured, as indicated. These brace-rods are so arranged, as shown in the drawings, that the vertical movement of the frame 31 upon the springs 25 26 is compensated for, so that there is a continuous equal bearing upon said rods at all times, and by this means the necessary direct connection between the axles is provided for without depending wholly upon the connections to the springs by which the frames are attached, and uniform distances between the corresponding ends of the two axles is maintained, which is quite desirable, especially in high-speed machines—that is, the distances between the axles, while varying slightly, are always made to vary equally throughout their lengths, so that their parallel relation remains unaffected.

Having thus fully described our said invention, what we claim as new, and desire to secure by Letters Patent, is—

1. The combination, in a running-gear for vehicles, of the axles, suitable springs carried thereby, and two frames supported at two points at or near one end and at one point at or near the other end, the supporting-points of the two frames being arranged reversely with respect to each other, each of said frames being spring-supported at the end having two points of support, and one of said fames having its single point of support carried from the spring-supported end of the other frame.

2. The combination, in a running-gear for vehicles, of the vehicle-axles, suitable springs carried by said axles, one frame carried by two spring-mounted points of support from one of said vehicle-axles, another frame likewise carried from two spring-mounted points of support from the other of said vehicle-axles, and each of said frames carried by one point of support from the axle opposite to that upon which it is carried by two points of support.

3. The combination, in a running-gear for vehicles, of two axles each carrying two springs, two frames, one of which is supported by a suitable point of support from each of the two springs upon one of the axles, and the other of which is carried by a suitable point of support from each of the two springs on the other axle, said first-mentioned frame being also supported by a single point of support carried from the opposite axle, and the second frame being carried by a single point of support upon the opposite end of the first-mentioned frame.

4. The combination, in a running-gear for vehicles, of a frame supported from the springs of the front axle and extending back in a downwardly-inclined direction toward the wheel-driving shaft where it is pivotally supported at a single point of support upon a structure carrying said wheel-driving shaft, said frame being provided with bearings for the main driving-shaft by means of which said wheel-driving shaft is driven, a second frame supported by the springs carried by the rear axle and extending forward in a substantially horizontal direction, and supported at the other end by a single pivotal point of support from the first-mentioned frame, said last-mentioned frame being adapted to carry the bed and seats of the vehicle, and said first-mentioned frame being adapted to carry the motor and driving mechanism.

5. The combination, in a running-gear for vehicles, of two frames each supported at two points at or near one end and at one point at or near the other end, the duplicate supporting-points of each being at that end where the single supporting-point of the other is located, and one of the frames having its single point of support carried rigidly from one of the axles, while the other has its single point of support carried from the first-mentioned frame at the end where it is spring-supported.

6. The combination, in a running-gear for vehicles, of a frame carried at two points of support by the springs carried by one axle, and pivotally mounted on the sheath or casing containing the main driving-shaft which drives the wheel-driving shaft, and having at its extreme forward end a cross-bar connected thereto by means of links; and a second frame mounted by two points of support upon the springs carried by the other axle at one end, and by a pivotal connection upon the link-carried cross-bar of the first-mentioned frame at the other end.

7. The combination in a running-gear for vehicles, of two axles each carrying two springs, two frames, one of which is supported by a suitable point of support from each of the two springs carried by one of the axles, and the other of which is carried by a suitable point of support from each of the two springs carried by the other axle, and each of said frames having a single point of support from the opposite axle, and brace-rods running from each of the axles directly to one of said frames, whereby uniform distances between the corresponding ends of the axles are maintained notwithstanding the variations caused by the vibration of the springs.

8. The combination, in a running-gear for vehicles, wherein there are two separate frames, each spring-mounted, of the axles, said frames, and brace-rods running from the axles directly to a stationary connection with one of said frames.

9. The combination, in a running-gear for vehicles, of the vehicle-axles, suitable springs carried by said axles, one frame carried by two spring-mounted points of support from one of said vehicle-axles, another frame likewise carried at two spring-mounted points of support from the other vehicle-axle, one of said frames carried by one point of support from the axle opposite to that upon which it is carried by two points of support, and the other frame carried by a suitable support from the axle from which the one frame is carried by two points of support.

10. In a motor-vehicle, a running-gear consisting of a driving-axle structure, a motor-frame, a pivotal connection between said motor-frame and said driving-axle structure, substantially at right angles to said structure, a second axle structure upon which said motor-frame is in part supported, a driving-shaft having its axis coincident with the pivotal axis of said frame, a motor mounted on said motor-frame and connected to and driving said shaft, and a second frame mounted on the driving-axle structure and pivotally supported from the second axle structure.

11. In a motor-vehicle, the combination of, a pair of axles and their supporting-wheels, springs carried by said axles, a wheel-driving shaft, a motor-frame supported in part by the springs of one axle, a second frame supported in part by the springs of the other axle, a pivotal connection between the two frames forming a support for the second frame substantially at right angles to the wheel-driving shaft whereby relative movement between the two frames may be had about said pivotal connection, a motor carried by the motor-frame, and intermediate driving connections between the motor and the wheel-driving shaft held during relative movement between the two frames.

12. In a motor-vehicle, the combination of, a pair of axles and their supporting-wheels, springs carried by said axles, a wheel-driving shaft, a motor-frame supported in part by the springs of one axle, a second frame supported in part by the springs of the other axle, a pivotal connection between the two frames forming a support for the second frame substantially at right angles to the axles whereby relative movement between the two frames may be had about said pivotal connection, a motor carried by the motor-frame, and intermediate driving connections between the motor and the wheel-driving shaft held during relative movement between the two frames.

13. In a motor-vehicle, the combination of, a pair of axles and their supporting-wheels, springs carried by said axles, a motor-frame supported on the springs of one of said axles, a second frame supported on the springs of the other axle, a pivotal connection between said two frames forming a support for the second frame on an axis substantially at right angles to the axles, a wheel-driving shaft, a motor carried by the motor-frame and provided with a main drive-shaft, a pivotal support for the motor-frame, the axis of which is coincident with the axis of the main drive-shaft and substantially at right angles to the axis of the wheel-driving shaft, and intermediate driving connections between the main driving-shaft and the wheel-driving shaft undisturbed by reason of swing of the motor-frame about the axis of the main driving-shaft.

14. In a motor-vehicle, the combination of, a pair of axles and their supporting-wheels, springs carried by said axles, a motor-frame supported on the springs of one of said axles, a second frame supported on the springs of the other axle, a pivotal connection between said two frames forming a support for the second frame on an axis substantially at right angles to the axles, a wheel-driving shaft, a motor carried by the motor-frame and provided with a main drive-shaft, a pivotal support for the motor-frame, the axis of which is coincident with the axis of the main drive-shaft, and intermediate driving connections between the main driving-shaft and the wheel-driving shaft undisturbed by reason of swing of the motor-frame about the axis of the main driving-shaft.

15. In a motor-vehicle, the combination of, a pair of axles and their supporting-wheels, springs carried by said axles presenting two transversely-separated points of support at each axle, a motor-frame supported at two transversely-separated points from the springs of one axle, a second frame supported at two transversely-separated points from the springs of the other axle, a pivotal connection between the two frames forming a support for the second frame on an axis substantially at right angles to the axles, a motor carried by the motor-frame, a wheel-driving shaft, and intermediate driving connections between the motor and the wheel-driving shaft undisturbed by reason of relative movement between the two frames on the axis substantially at right angles to the axles.

16. In a motor-vehicle, the combination, of a pair of axles and their carrying-wheels, springs carried thereby, two frames supported at two transversely-separated points at or near one end and on a single pivotal axis, at or near the other end, substantially at right angles to the axles, the supporting-points of the two frames being arranged reversely with respect to each other, and each of said frames being spring-supported at the end having the two transversely-separated points of support, and one of said frames having its single pivotal axis carried by one of said frames, a wheel-driving shaft relative to which the motor-carrying frame may swing upon its single pivotal axis, and a driving connection between the motor and the wheel-driving shaft held during movement of the motor-carrying frame about its axis of support at right angles to the axles.

17. In a motor-vehicle, the combination, of a pair of axles and their carrying-wheels, springs carried thereby, two frames supported at two transversely-separated points at or near one end and on a single pivotal axis, at or near the other end, substantially at right angles to the axles, the supporting-points of the two frames being arranged reversely with respect to each other, and each of said frames being spring-supported at the end having the two transversely-separated points of support and one of said frames having its single pivotal axis carried by the spring-supported end of the other frame, a motor carried by one of said frames, a wheel-driving shaft, and a driving connection between the motor and the wheel-driving shaft held during movement of the motor-carrying frame about its axis of support at right angles to the axles.

18. In a motor-vehicle, the combination, of a pair of axles and their carrying-wheels, springs carried by said axles, one frame carried by two transversely-separated spring-mounted points of support over one of said axles, another frame likewise carried by two transversely spring-mounted points of support over the other of said axles, and a single pivotal support, the axis of which is substantially at right angles to the axles, intermediate each frame and the axle upon which it is not directly spring-mounted, a motor carried by one of said frames, a wheel-driving shaft, and intermediate driving connections between said motor and wheel-driving shaft held during oscillation of the motor-carrying frame.

19. In a motor-vehicle, the combination of a driving-axle structure, a wheel-driving shaft carried thereby, supporting-wheels connected to said shaft, a motor-frame, a pivotal connection between said motor-frame and said driving-axle structure substantially at right angles to said structure, a second axle structure, a spring connection between said second axle structure and the motor-frame, a motor carried by said motor-frame, a main driving-shaft carried by the motor-frame, driving connections between said main driving-shaft and the wheel-driving shaft held during vibration of the motor-frame about its pivotal connection with the driving-axle structure, and a pivotal connection between the said second frame and the motor-frame, the axis of which is substantially at right angles to the axle structure.

20. In a motor-vehicle, the combination of, a pair of axles and their supporting-wheels, springs carried by said axles, a motor-frame pivotally supported on the springs of one axle on an axis parallel therewith, a second frame pivotally supported on the springs of the other axle on an axis parallel therewith, a pivotal connection between said second frame and the motor-frame on an axis substantially at right angles to the axles, a wheel-driving shaft, a motor carried by the motor-frame, and driving connections between the motor and wheel-driving shaft held during relative movement of the two frames about their connecting-axis.

21. In a motor-vehicle, the combination of, a pair of axles and their supporting-wheels, springs carried by said axles, a motor-frame pivotally supported on the springs of one axle on an axis parallel therewith, a second frame pivotally supported on the springs of the other axle on an axis parallel therewith, a pivotal connection between said second frame and the motor-frame on an axis substantially at right angles to the axles, a wheel-driving shaft, a motor carried by the motor-frame, and driving connections between the motor and wheel-driving shaft maintainable during relative movement of the two frames about their connecting-axis.

22. In a motor-vehicle, the combination of, a pair of axles and their supporting-wheels, springs carried by said axles, a motor-frame pivotally supported on the springs of the first axle on an axis parallel therewith and pivotally supported on the second axle on an axis at right angles thereto, a second frame pivotally supported on the springs of the second axle on an axis parallel therewith and pivotally supported on the motor-frame on an axis at right angles to the axles, a motor carried by the motor-frame, a wheel-driving shaft carried by the second axle, and driving connections between the motor and wheel-driving shaft held during relative movement of the motor-frame and the second axle about the axis at right angles to the axle.

23. In a motor-vehicle, the combination, of a pair of axles and their supporting-wheels, a motor-frame supported in part by one axle, a second frame supported in part by the other axle, a pivotal connection between the two frames forming a support for the second frame substantially at right angles to the axles, a wheel-driving shaft, a motor carried by the motor-frame, and intermediate driving connections between the motor and the wheel-driving shaft held during relative movement between the two frames.

24. In a motor-vehicle, the combination, of a pair of axles and their supporting-wheels, a motor-frame supported in part by one of said axles, a second frame spring-supported by the other axle, a pivotal connection between the two frames forming a support for the second frame substantially at right angles to the axles whereby relative movement between the two frames may be had about said pivotal connection, a motor carried by the motor-frame, a wheel-driving shaft, and intermediate driving connections between the motor and the wheel-driving shaft held during relative movement between the two frames.

25. In a motor-vehicle, the combination, of a pair of axles and their supporting-wheels, a motor-frame supported in part by one of said axles and supported by the other axle on an axis substantially at right angles thereto, a wheel-driving shaft carried by said last-mentioned axle, a second frame supported by said last-mentioned axle, a pivotal connection between the two frames forming a support for the said second frame substantially at right angles to the axles, a motor carried by the motor-frame, and intermediate driving connections between the motor and the wheel-driving shaft held during relative movement between the motor-frame and the axle which carries the wheel-driving shaft.

In witness whereof we have hereunto set our hands, at Indianapolis, Indiana, this 26th day of April, A. D. 1906.

JESSE WARRINGTON.
HOWARD C. MARMON.

Witnesses:
ARTHUR M. HOOD,
THOMAS W. MCMEANS.